United States Patent [19]

Muller et al.

[11] Patent Number: 5,376,274
[45] Date of Patent: Dec. 27, 1994

[54] HYDROPHILIC MEMBRANE AND METHOD FOR ITS PRODUCTION

[75] Inventors: Heinz-Joachim Muller, Bad Kreuznach; Tilo Renner, Mandel; Anneliese Kuchar, Hergenfeld, all of Germany

[73] Assignee: Seitz-Filter-Werke GmbH & Co., Bad Kreuznach, Germany

[21] Appl. No.: 62,854

[22] Filed: May 17, 1993

[30] Foreign Application Priority Data

May 26, 1992 [DE] Germany ............................ 4217335

[51] Int. Cl.$^5$ .............................................. B01D 39/00
[52] U.S. Cl. ........................... 210/500.41; 210/500.42; 210/490; 264/48
[58] Field of Search ............... 210/500.42, 490, 500.41, 210/500.27, 636; 264/41, 48; 428/305

[56] References Cited

U.S. PATENT DOCUMENTS

| 4,286,015 | 8/1981 | Yoshida et al. | 428/305 |
| 4,413,074 | 11/1983 | Wrasidlo et al. | 524/43 |
| 5,019,261 | 5/1991 | Stengaard | 210/500.42 |
| 5,091,086 | 2/1992 | Stengaard | 210/490 |
| 5,238,570 | 8/1993 | Hugl et al. | 210/500.41 |

FOREIGN PATENT DOCUMENTS

| 005536 | 11/1979 | European Pat. Off. . |
| 0082433 | 6/1983 | European Pat. Off. . |
| 082433 | 6/1983 | European Pat. Off. . |
| 108601 | 5/1984 | European Pat. Off. . |
| 228072 | 7/1987 | European Pat. Off. . |
| 0550798 | 7/1993 | European Pat. Off. . |
| 3149976 | 6/1983 | Germany . |
| 3814759 | 11/1989 | Germany . |
| 4000825 | 3/1990 | Germany . |
| 4007383 | 12/1991 | Germany | 210/500.41 |
| 1268302 | 11/1986 | Japan | 210/500.41 |
| 62-38205 | 2/1987 | Japan . |
| 63-97205 | 4/1988 | Japan . |
| 3209707 | 8/1988 | Japan | 210/500.41 |
| 63-277251 | 11/1988 | Japan . |
| 2139020 | 5/1990 | Japan | 210/500.41 |

Primary Examiner—Robert A. Dawson
Assistant Examiner—Ana M. Fortuna
Attorney, Agent, or Firm—H. Gibner Lehmann; K. Gibner Lehmann

[57] ABSTRACT

A permanently hydrophilic membrane on an aromatic polysulphone basis and a method for its production. Due to their chemical and thermal resistivity and also because they are unobjectionable with respect to their contacting foodstuffs, membranes on an aromatic polysulphone basis represent a preferred filtration material. But since they are hydrophobic, they would have to be hydrophilated before they are used. Known hydrophilation methods were insufficient to maintain the hydrophilic properties of the membranes, especially after repeated sterilization. The new method aims at making the membranes permanently hydrophilic under sterilization conditions. In an aftertreatment step, the membranes on an aromatic polysulphone basis are conducted, before or after drying, through an impregnating bath of polyvinylpyrrolidone, a copolymer of vinylpyrrolidone and one or more hydrophobic monomers and peroxodisulphate, then heated to 70 to 150° C. and cooled down again. The membranes thusly treated remain spontaneously water wettable even after the sterilization.

22 Claims, 1 Drawing Sheet

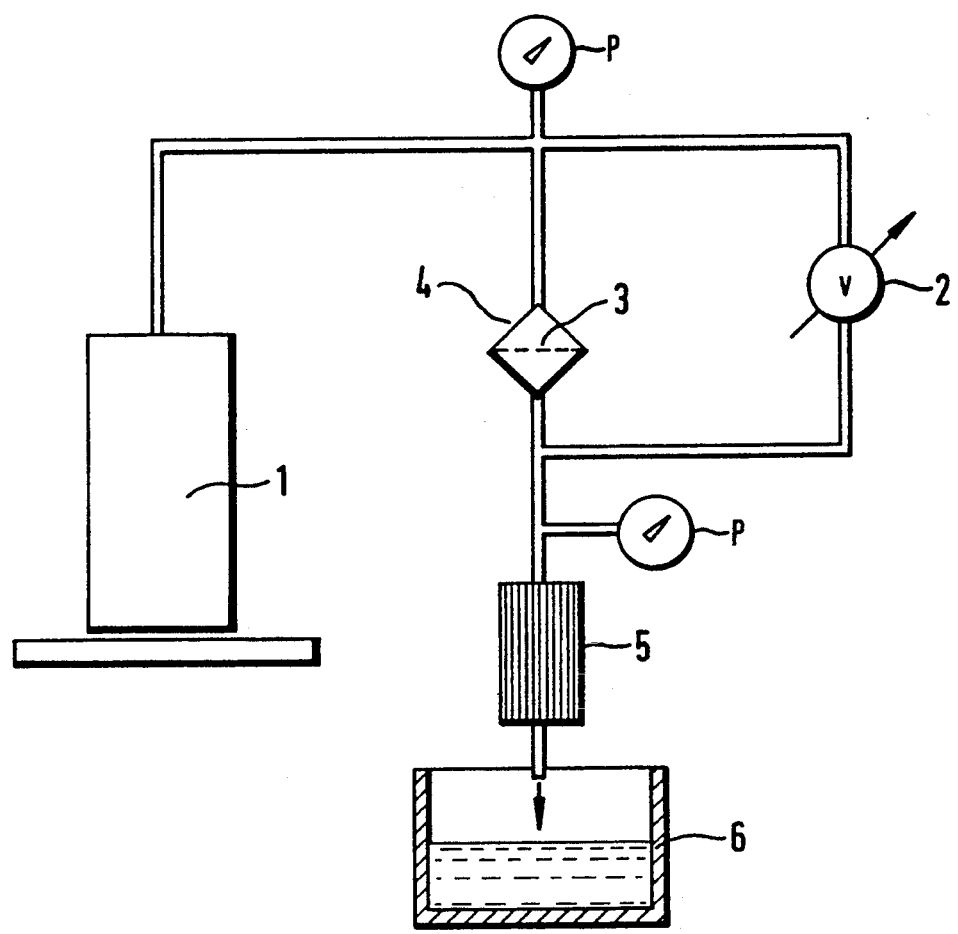

HYDROPHILIC MEMBRANE AND METHOD FOR ITS PRODUCTION

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to a permanently hydrophilic membrane on an aromatic polysulphone basis, and to a method for its production.

2. Description of the Related Art Including Information Disclosed Under 37 CFR §§1.97–1.99

Synthetic polymer membranes, in particular microporous membranes, have been known for a long time and are generally used for the filtration of liquids and gases, as for example described in "Kesting, R. E.: Synthetic Polymeric Membranes, McGraw Hill Book Co., New York, 1971". Used as polymer materials are for example, polyolefins, polyamides and aromatic polysulphones.

A majority of such membranes is utilized for the filtration of aqueous solutions such as for the manufacture of beverages and pharmaceuticals, or for the preparation of processing waters. It is for this reason that such membranes must advantageously be hydrophilic which means that, in their dry state, they must be spontaneously and completely water wettable so that the aqueous medium can be properly filtered through the membrane.

The requirement that such membranes be completely wettable is especially important in practical applications because, on the one hand, the obligatory testing of the membranes as to their suitability should be performed in situ and on the other hand, because it often seems advisable, particularly in the pharmaceutical and food industries, to sterilize the membranes prior to their use in order to avoid contamination from the membrane during its application. Such a sterilization is usually performed by flushing steam through the membranes of filter modules. While in the beverage industry the usual conditions for this process call for a steam pressure of 1 bar (and a corresponding temperature of 121° C.), sterilization in the pharmaceutical industry takes place at a steam pressure of 2 bars (and a corresponding temperature of 134° C.). Most state-of-the-art membranes are incapable of withstanding the high thermal and chemical stresses this involves because membranes constructed of hydrophilic polymer material are unstable against oxidizing agents per se, and hydrophilated membranes, consisting of hydrophobic raw material per se, will lose their hydrophilic qualities relatively quickly during the steam distillation, especially if tensides or the like are added.

Known from EP 005 536 are membranes constructed of hydrophilic amides and generally showing good water wettability. Their high sensitivity to oxidizing agents such as hypochlorite solution and to strongly alkaline or acid solutions greatly restricts their usefulness in the above described fields of application.

Known from EP 0 108 601 are membranes made of hydrophobic polypropylene which, however, must first be hydrophilated at great cost before they are tested for their suitability and before they are used.

Membranes made of aromatic polysulphone prove to be extraordinarily stable against oxidizing agents But they are normally not hydrophilic However, a number of membranes on a polysulphone basis which are water wettable under normal conditions are also known. The production of such hydrophilated aromatic polysulphone membranes is described in EP 0 082 433. By coagulating the polymer solution in a water bath the membranes are produced by the so-called precipitating bath method and supposedly contain "solidified" polyvinylpyrrolidone, according to the inventor's statement. The thus produced membranes are called hydrophilic, their hydrophilic qualities being supposedly characterized by the membranes' water take-up of greater than 11%.

In EP 0 082 433, the hydrophilic quality of the membrane consisting of hydrophobic polysulphone matrix material is brought about by admixing 15–70% polyvinylpyrrolidone (PVP). After having been produced, such membranes are indeed hydrophilic, but after repeated steam distillations at 2 bars steam pressure (and a corresponding temperature of 134° C.), which is mandatory in the pharmaceutical industry, they lose their water wettability increasingly from distillation to distillation.

A similar process is described in DE-PS 40 00 825. In contrast to DE-PS 31 49 976, only about 0.5% polyvinylpyrrolidone relative to the polymer is typically added. The membrane is formed from the polysulphone solution by the influence of air humidity. In both patents, the cross-linking of PVP is mentioned, the chemical cross-linking being effected in particular by the addition of caustic soda lye, however. But both patents have in common that their membranes, after several water vapor sterilizations at 2 bars pressure, are no longer adequately water wettable. Also, after extraction with boiling alcohol and subsequent drying, the membranes are no longer water wettable.

In EP 02 28 072, membranes are described which consist of a mixture of a water-soluble polymer such as PVP or polyethyleneglycol and a membrane-forming polymer, the latter being characterized in that, in unprocessed form, it takes up 2–4% water. This patent expressly differentiates between the various types of aromatic polysulphones, and it points out that only polymers with 2–4% water take-up, i e. of aromatic polysulphones, only polyethersulphone exclusively, and not polysulphone which takes up less water, are suited for the production of hydrophilic membranes.

Because of their extremely advantageous thermal and chemical resistability, and not least also because of their being unobjectionable with respect to their contacting foodstuffs, membranes on an aromatic sulphone basis represent a most desirable material in processes of the pharmaceutical and food industries. But since they are hydrophobic (in particular polysulphone and polyarylsulphones with less than 2% water take-up capability) they would have to be made hydrophilous before they can be used. The current hydrophilating methods, especially for polysulphones and polyarylsulphones, were insufficient, however, to keep the membrane hydrophilic after repeated steam sterilizations or alcohol extractions required for sterilization. This restricted their applicability. It is decisive for a simple application such as the sterile filtration of aqueous media that the membranes can be tested for their functionability without incurring much expense, which means that it should be possible to test the membranes in their filter holders or filter modules without having to disassemble them from the filtering system. If they are used repeatedly, this is possible only if the membranes remain fully water wettable also after several sterilizations. A membrane filter having just one hydrophobic spot does not pass the test because the test gas will pass through this hydrophobic spot and the membrane must be rejected for safety reasons, although it would still have been intact as such.

SUMMARY OF THE INVENTION

The above disadvantages and drawbacks of membranes and methods for their production are obviated by the present invention.

Accordingly, the invention is based on the task of making available, from the thermally and chemically resistant plastic class of the aromatic polysulphones, membranes useable for the sterile filtration of aqueous solutions and which also remain hydrophilic permanently, even after several water vapor distillations, thus being capable of being tested without causing additional costs. The invention is also based on a method for manufacture of said membranes.

According to the method, the problem is solved so that membranes produced by methods known per se are led, before or after drying, through an impregnating bath which contains as an aqueous solution:

0.01–2 weight percent polyvinylpyrrolidone and 0.01–2 weight percent of a copolymer consisting of 5–80% monomer parts of vinylpyrrolidone and a total of 95–20 % monomer parts of one or more hydrophobic monomers, peroxodisulphate in an amount of 0.1–10 times the weight percentage of the total PVP and polymer weight used and an alcohol with 1 to 4 C atoms in such a quantity that turbidity of the aqueous solution is barely prevented, and the membrane thus impregnated is heated to a temperature of 70–150° C. over a period of 1–60 minutes and subsequently allowed to cool down to room temperature.

The membranes thus obtained are spontaneously water wettable without wetting aids, also after repeated water vapor sterilization or extraction with boiling alcohol and can therefore be tested in their filter holders or filter modules.

The aromatic polysulphone is dissolved in a suitable solvent in a manner known per se. Suitable solvents are among others:

Dimethylsulphoxide, dimethylformamide, dimethylacetamide and N-methylpyrrolidone. It is common usage to mix the polymer solutions additionally with another substance, the so-called non-solvent. It is also possible to use several non-solvents. The non-solvent's function is to bring the polymer solution so close to the polymer precipitation point that small amounts of another or the same non-solvent already contribute to the forming of the membrane as it forms. A number of different substances may be used as non-solvents. Generally, water-soluble non-solvents are preferred because then the finished membrane can be rinsed out with water at low cost.

Suitable non-solvents are, among others: Polyethylene-glycol, ethyleneglycol, glycerin, water, propylenecarbonate, ethylenecarbonate, and butyrolacton.

Polyvinylpyrrolidone (PVP) for example may be used as an additional ingredient to alter the polymer solution's viscosity as desired. The membrane structure may be influenced in a desired manner by further additives such as nucleation agents, tensides or highly volatile solvents or non-solvents.

The polymer solution thus produced is poured as a thin film on a substrate and then solidified through the influence of humid air or by immersing the film in a non-solvent bath.

A fleece or another supporting material for reinforcement may also serve as a substrate for such flat membranes.

The membrane may also be formed as a capillary membrane by extruding the polymer solution through an annular nozzle. Fed to the interior of the nozzle at the same time is an internal liquid consisting of a suitable solvent/non-solvent mixture in order to thus form the inner space of the capillary membrane. The threadlike solution thus formed is solidified by immersion in a suitable precipitation bath.

After solidification, the flat or capillary membrane is rinsed out in water between 10 and 100 ° C. to remove solvents and non-solvents from the membrane. The rinsed-out membrane is subsequently dried, thus obtaining the ready-to-use membrane. The decisive step of the invention can now be taken before or after the drying operation.

It involves conducting the finished membrane in either a wet or dry state through an impregnating bath containing 0.01–2 weight percent polyvinylpyrrolidone and 0.01–2 weight percent polyvinylpyrrolidone copolymers in an aqueous solution. To impregnate still wet membranes, a time interval of at least 5 to about 60 seconds suffices. A time span of at least 2 to 10 seconds is needed for previously dried membranes. The copolymers are characterized in that from 5–80% vinylpyrrolidone monomer parts and a total of a corresponding 95–20% monomer parts of one or more hydrophobic monomers are produced. Instead of a single hydrophobic monomer, mixtures of different monomers are imaginable also, it being decisive that a substantial part of these monomers be hydrophobic.

The impregnating solution additionally contains peroxodisulphate, preferably in the form of sodium, potassium or ammonium salt. The peroxodisulphate amount lies between 0.1 to 10 times the polymers used (PVP and copolymer together), preferably between 0.2 and 3 times. In addition to the water, an alcohol is used as auxiliary solvent, of which an adequate amount is added to the solution such that the polymers are soluble without substantial clouding.

The membrane thus impregnated is subsequently heated to 70°–150° C., preferably 80°–110° C., over a period of 1 to 60 minutes, preferably 2–10 minutes. This heating causes a drastic improvement of the membrane's hydrophilic properties which are still preserved after steam sterilization.

The aromatic polysulphone used as a matrix polymer is understood to be a polymer containing as a structural unit at least the sulphone group (—$SO_2$—) and the aromatic benzene ring with at least two valences. The U.S. Food and Drug Administration differentiates between polysulphone, polyethersulphone and polyarylsulphone (21 CFR Ch. I [Apr. 1, 1989 edition], §§177.1560-§§177.2450). As to their structure, these polymers are characterized as follows:

Polysulphone

-continued

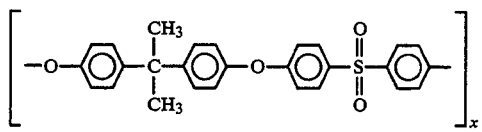

Polyethersulphone

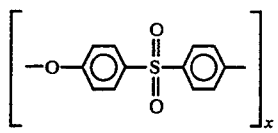

Polyarylsulphone copolymer from:

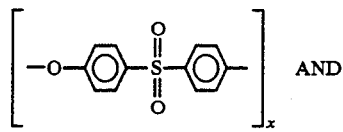   AND

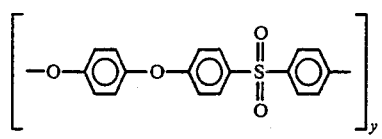

Polysulphone differs from the two other compounds mentioned due to its structural unit

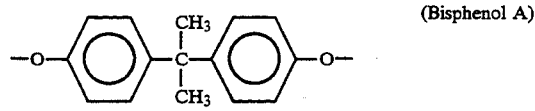

(Bisphenol A)

whose distinct hydrophobic character is responsible for the poor hydrophilic properties of this polymer. The two other polymers, polyethersulphone in particular, take up more water. According to EP 0 228 072, the water take-up of polyethersulphone is 2.5%. Besides these commercial types of aromatic polysulphones, a series of other polysulphones of similar structure is yet possible, special mention being made of aromatic polysulphones with the structural unit bisphenyl, usually called polyphenylsulphone. However, all aromatic polysulphones can be hydrophilated permanently by the method according to the invention.

The addition of one or more hydrophobic monomers to form the copolymer in the impregnating bath is essential. Vinylpyrrolidone alone does not provide hydrophilic properties when the membranes are treated with water vapor. The resulting copolymer would, therefore, not assure permanent hydrophilic properties.

It goes without saying that hydrophilation by the method according to the invention is not limited to membranes for microfiltration alone; membranes with pore sizes characteristic for ultrafiltration and reverse osmosis on an aromatic polysulphone basis can also be hydrophilated permanently by the method according to the invention.

BRIEF DESCRIPTION OF THE FIGURE

To simulate in the laboratory a practice-relevant steam treatment of the membrane, a test setup was chosen as shown in the FIGURE.

DESCRIPTION OF EXAMPLE EMBODIMENTS

The invention is explained below in greater detail by way of typical examples:

The steam generator 1 is set to a steam pressure of 2 bars (at a corresponding temperature of 134° C.). The differential pressure control 2 makes certain that the pressure difference at the membrane 3 is kept within the 0.1-0.3 bar range to assure a flow through the membrane, but protect it from damage by too high a differential pressure. The condensate is precipitated in a condensate separator 5 and collected in a container 6.

TEST FOR SPONTANEOUS WATER WETTABILITY (a) A piece (50 mm. in diameter) is stamped out of a dry test membrane and placed on water of 20° C. After one minute a visual check is made whether the membrane was spotlessly wetted by water. A membrane is called spontaneously water wettable if it is wetter by water virtually spotlessly. This test applies for all membranes having pore diameters in the microfiltration range of 0.01-5 um.

TEST FOR HYDROPHILIC PROPERTIES (b) The dry membrane is clamped in a filter holder, coated with water of 20° C. (about 5 to 10 min. high), and air pressure is applied from below (=bubble point test). After measuring the bubble point, the membrane is wetted with ethanol in another filter holder and rinsed out with 10 ml. water per cm.$^2$ membrane. Then the bubble point is measured again, but with the wet membrane.

Evaluation: If the bubble point of the first measurement amounts to at least 80% of the second measurement, the membrane is called hyrdophilic, otherwise hydrophobic.

EXAMPLE 1

30 g. polysulphone P1800 are dissolved under stirring and slight heating in a mix of 100 g. N-methylpyrrolidone and 190 g. polyethyleneglycol (PLURIOL 400 brand of polyethyleneglycol, which has an average molecular weight of 400). Added to this mix is 0.6 g. polyvinylpyrrolidone (KOLLIDON K90 brand of polyvinylpyrrolidone, which has an average molecular weight of 360,000) which is also dissolved while stirring The viscous solution obtained is spread on a glass plate as a film of 0.03 mm. thickness and left standing exposed to air. While standing, the hygroscopic solution absorbs moisture from the air. This causes the polysulphone to precipitate, and after the membrane thus created has solidified sufficiently it is dried after being rinsed out with water. The membrane material thus produced is partly hydrophilic.

After rinsing out the solvents with the aid of water, the polyvinylpyrrolidone still present in the membrane and possibly still capable of being washed out can be made soluble in a further step of the method. For this purpose, the washed membrane is placed in a hot, 10% caustic soda lye for a period of about 1 minute. The caustic soda lye is subsequently washed out with water. After drying, the membrane thus obtained wets spontaneously with water.

(a) A part of the membrane is extracted with boiling ethanol in a Soxhlet extractor for a period of 2 hours. After drying, the membrane is completely hydrophobic.

(b) Another part of the membrane is subjected to a 134° C. flow of steam for one half hour. After drying, the membrane is completely hydrophobic.

EXAMPLE 2

30 g. polysulphone P 1800 are dissolved by stirring and slight heating in a mix of 100 g. N-methylpyrrolidone and 190 g. polyethyleneglycol (PLURIOL 400 brand of polyethyleneglycol, which has an average molecular weight of 400). Added to this mix are 0.6 g. polyvinylpyrrolidone (KOLLIDON K90 brand of polyvinylpyrrolidone, which has an average molecular weight of 360,000) which are likewise dissolved while stirring. The viscous solution obtained is spread on a glass plate as a film of 0.3 mm. thickness and left standing exposed to air. While standing, the hygroscopic solution absorbs moisture from the air. This causes the polysulphone to precipitate. After the membrane thus created has solidified sufficiently, it is rinsed out with water and subsequently dried.

The membrane thus dried is then immersed in a solution of 0.3% PVP K90, 0.3% copolymer VP/VA 1:1 and 0.5% sodiumperoxodisulphate in water/ethanol 4:1, removed therefrom after 5 seconds, dabbed with paper and dried on a drum drier at a temperature of 90° C.

(a) One part of this membrane is extracted with ethanol in a Soxhlet extractor over a period of 2 hours. After drying, the membrane wets completely and spontaneously with water.

(b) Another part of the membrane is subjected three times for half an hour each to a flow of water vapor at a temperature of 134° C. After drying, the membrane is again completely wetted with water.

EXAMPLE 3

11 weight parts polyphenylsulphone (Radel R5000, Amoco) are dissolved in 34.8 weight parts NMP (N-methylpyrrolidone) at 80° C. while stirring. The homogeneous solution is then cooled down to 30° C. and a mixture consisting of 52.2 weight parts PEG 400 and 3 weight parts glycerin is added slowly while stirring intensively. Stirring is continued for 3 hours until the solution is homogeneous, and then the solution is degassed by leaving it in the closed container for a period of 15 hours.

The degassed solution is poured on a glass plate to form a film of 260 um. thickness by means of a doctor blade. Air of 25° C., 95% relative humidity and 0.2 m/s velocity is blown over the solution film. The polymer precipitates due to absorption of water from the air.

After solidification of the polymer, the membrane obtained is removed from the glass plate after half an hour and washed in water at a temperature of 80° C. over a period of 2 hours. Then the membrane is removed and dried on a drum drier at 90° C.

The membrane obtained has the following characteristics:
Thickness: 150 um
Bubble point in water: 1.7 bar
Water flow-through: 48 ml./(cm.2min- bar)
The membrane is water wettable.

(a) The membrane thus obtained is extracted in boiling ethanol in a Soxhlet extractor over a period of 2 hours. After the membrane has dried, it is no longer water wettable.

(b) Another part of the membrane was subjected three times over a period of one half hour each to a water vapor flow at 134° C. After drying, the membrane was hydrophobic.

EXAMPLE 4

A membrane produced in accordance with Example 3 was immersed in wet state in an impregnating bath of 0.22% PVP K120 and 0.2% VP/VA copolymer 1:1 and 0.5% potassiumperoxodisulphate in ethanol/water 1:4 and removed therefrom after 10 minutes. The membrane was then dried on a drum drier at 95° C.

The membrane thus obtained had the following characteristics:
Bubble point in water: 1.7 bar
Water flow-through: 44 ml./(cm.2min. bar)
The membrane was spontaneously water wettable.

(a) The membrane was extracted in boiling ethanol in a Soxhlet extractor over a period of 2 hours. After the membrane had dried, it could be wetted with water.

(b) Another part of the membrane was subjected to a flow of water vapor of a temperature of 134° C., five times for a period of one half hour each. After drying, the membrane was hydrophilic.

In the appended claims, applicants intend the word "aqueous" to include not only water but water-containing liquids, such as for example alcohol.

The present application claims priority under 35 USC 119, of German Application No. P 42 17 335.3 filed May 26, 1992.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A hydrophilic membrane manufactured from an aromatic polysulphone membrane, by means of passing the aromatic polysulphone membrane through an impregnating bath containing an aqueous solution of 0.01–2 percent by weight of polyvinylpyrrolidone and 0.01–2 percent by weight of a copolymer consisting of 5–80% vinylpyrrolidone monomer parts and 95% to 20% monomer parts of hydrophobic monomers, and containing peroxodisulphate in an amount of 0.1 to 10 times by weight of the percentage of the polyvinylpyrrolidone and copolymer, and further containing alcohol having 1 to 4 carbons atoms in such quantity that clouding of the aqueous solution is barely avoided, and heating the membrane thus impregnated to a temperature of between 70 and 150 degrees C. for a period of from 1 minute to 60 minutes and then subsequently cooling the membrane to room temperature, said cooled membrane exhibiting hydrophilic properties which enable it to thereafter remain spontaneously water wettable.

2. A membrane according to claim 1, wherein the membrane is microporous and has a maximum pore size in the range of from 0.01 to 5 um.

3. A membrane according to claim 1, wherein the membrane is flat.

4. A membrane according to claim 3, and further including a substrate on which the membrane is carried, said substrate constituting a reinforcement for the membrane.

5. A membrane according to claim 1, wherein the cooled membrane remains spontaneously water wettable even after being subjected to a sterilizing treatment which comprises flowing an aqueous vapor over the membrane at an elevated temperature for a total time span of at least one hour.

6. A membrane according to claim 1, wherein the said cooled membrane exhibits hydrophilic properties which enable the membrane to remain spontaneously water wettable even after being subjected to multiple sterilizing exposures to boiling alcohol for a total time span of several hours.

7. A method for the production of a permanently hydrophilic membrane from an aromatic polysulphone membrane, which includes the steps of impregnating a flat or capillary polysulphone membrane with an aqueous solution containing 0.01–2 percent by weight of polyvinylpyrrolidone and 0.01–2 percent by weight of a copolymer consisting of 5–80% vinylpyrrolidone monomer parts and 95% to 20% monomer parts of one or more hydrophobic monomers, and containing peroxodisulphate in an amount of 0.1 to 10 times by weight of the percentage of the polyvinylpyrrolidone and copolymer, and further containing alcohol having 1 to 4 C atoms in such quantity that clouding of the aqueous solution is barely avoided, heating the membrane thus impregnated to a temperature of between 70 and 150° C. for a period of from 1 minute to 60 minutes and then subsequently cooling the membrane to room temperature.

8. A method according to claim 7, wherein membrane while still in an undried state is impregnated for a period of time of from 5 to 60 seconds before it is heated.

9. A method according to claim 8, wherein the membrane is heated to between 80° and 110° C. after its impregnation.

10. A method according to claim 7, wherein the membrane while in a dried state is impregnated for a period of time of from 2 to 10 seconds.

11. A method according to claim 7, wherein vinylacetate is used as the hydrophobic monomer.

12. A method according to claim 7, wherein the peroxodisulphate is added in the form of its sodium salt.

13. A method according to claim 7, wherein the peroxodisulphate is added in the form of its potassium salt.

14. A method according to claim 7, wherein the peroxodisulphate is added in the form of its ammonium salt.

15. A method according to claim 7, wherein the peroxodisulphate is added in a proportion of 0.2 to 3 times the amount of the total polyvinylpyrrolidone and copolymer weight used.

16. A method according to claim 7, wherein the membrane is heated for a period of from 2 to 10 minutes after its impregnation.

17. A microporous hydrophilic membrane manufactured from an essentially hydrophobic aromatic polysulphone membrane having an equilibrium water absorption of less than 2%, wherein the hydrophilic membrane remains spontaneously water wettable after several treatments with flowing water vapor at 2 bars, at a temperature of about 134 degrees C., over a time span of at least one hour.

18. A membrane according to claim 17, wherein the membrane is in the form of a microporous membrane with a maximum pore size in the 0.01 to 5 um. range.

19. A membrane according to claim 17, wherein the membrane is in the form of a flat membrane.

20. A membrane according to claim 17, wherein the membrane is arranged on a fleece or substrate as reinforcement.

21. A method for the production of a permanently hydrophilic aromatic polysulphone membrane, which includes the steps of impregnating an essentially hydrophobic polysulphone membrane with an aqueous solution containing polyvinylpyrrolidone and a copolymer consisting of vinylpyrrolidone monomer parts and monomer parts of one or more hydrophobic monomers, and containing peroxodisulphate, and further containing alcohol, heating the membrane thus impregnated for a period of time, and then subsequently cooling the membrane to room temperature.

22. A microporous hydrophilic membrane manufactured from an essentially hydrophobic aromatic polysulphone membrane having an equilibrium water absorption of less than 2%, wherein the hydrophilic membrane remains spontaneously water wettable after several exposures to boiling alcohol over a time span of at least two hours.

* * * * *